(No Model.)
S. S. RUMBERG.
WINDING MECHANISM.
No. 410,254. Patented Sept. 3, 1889.
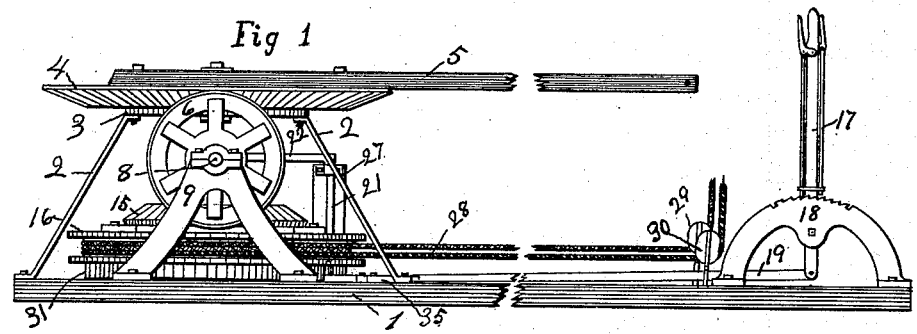
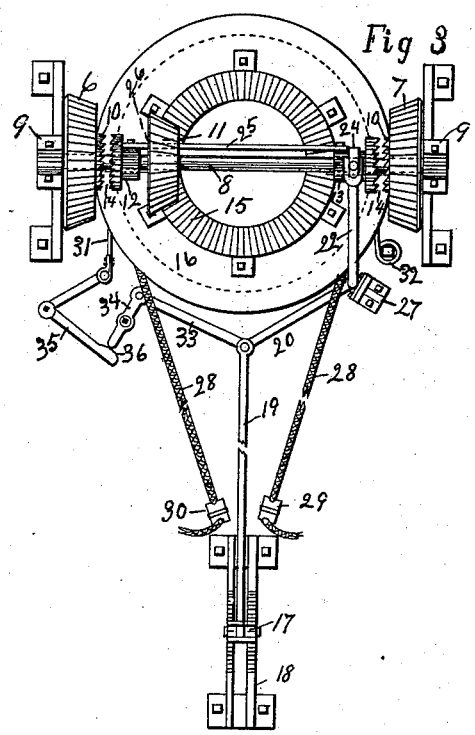
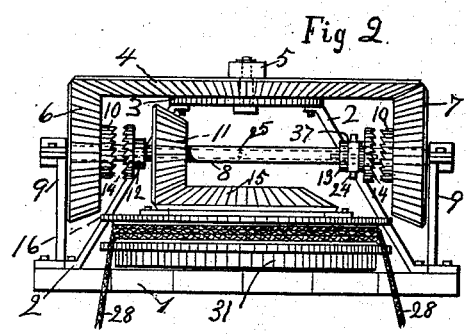
WITNESSES:
H. S. Smith.
Z. F. Wilber
INVENTOR
Samuel S. Rumberg
BY O'Brien & Co.
ATTORNEYS

UNITED STATES PATENT OFFICE.

SAMUEL S. RUMBERG, OF DENVER, COLORADO.

WINDING MECHANISM.

SPECIFICATION forming part of Letters Patent No. 410,254, dated September 3, 1889.

Application filed March 20, 1889. Serial No. 304,083. (No model.)

*To all whom it may concern:*

Be it known that I, SAMUEL S. RUMBERG, a citizen of the United States of America, residing at Denver, in the county of Arapahoe and State of Colorado, have invented certain new and useful Improvements in Horse-Power and Winding Mechanism, of which the following is a specification, reference being had therein to the accompanying drawings.

My invention relates to a new and improved form of horse-power and winding mechanism for elevating, hoisting, and hauling machinery of that class or type in which the horse or motive power travels constantly in one direction, the direction of movement of the elevating, hoisting, and hauling devices being controlled by clutches throwing into or out of gear with the main driving-wheel one or the other of two loose gears controlling the movement of the winding-drum; and its object is to furnish a horse-power and winding mechanism for the above-noted and other purposes of simple, strong, compact, and economical construction, durable in use, reliable in operation, and readily and easily operated and controlled; to which ends it consists in the features, arrangements, and combinations more particularly hereinafter described and claimed.

In the accompanying drawings is illustrated an embodiment of the invention, in which drawings—

Figure 1 is a side view or elevation thereof; Fig. 2, an end view thereof; Fig. 3, a top view with the main driving-wheel removed to show more clearly the clutch and winding mechanism.

In the drawings, the reference-numeral 1 indicates any suitable base upon which the operative parts are mounted, and by which they are supported. Upwardly projecting therefrom are a suitable number of standards 2, supporting a seat or platform 3, upon which is journaled the main driving-wheel 4, to which the power is to be applied, a tongue 5 being shown as secured to such wheel, and to which an animal or animals may be attached, as illustrative or typical of any means by which power may be applied to such main driving-wheel. This wheel meshes with the wheels 6 and 7 at diametrically-opposite points, the wheels 4, 6, and 7 to this end being preferably bevel gear-wheels. The gear-wheels 6 and 7 are loose upon the transverse shaft 8, journaled in standards 9, rising from the base 1, and each is formed with its own interiorly-projecting sleeve, the ends of such sleeves being formed into clutch-gears 10. At a proper point on the transverse shaft 8 is rigidly secured a bevel gear-wheel 11, meshing with a bevel-gear 15, secured or formed upon the upper side of the winding-drum 16, pivoted upon the base to revolve in a plane parallel to the planes of the base and of the main driving-wheel.

Upon either side of the bevel gear-wheel 11 sleeves 12 13 are secured upon the shaft 8 by means of feathers or splines or equivalent devices locking the sleeves thereto for rotation, but permitting the sleeves to be moved or slid longitudinally thereon, and the outer ends of these sleeves are formed into clutch-gears 14, adapted to mesh and interlock with clutch-gears 10. These clutch-gear sleeves are united by a rod or bar 25, or by a number thereof passing from one to the other through a perforation or perforations 26 in the web of gear-wheel 11, the two sleeves so connected forming a unitary sliding portion of a clutch mechanism.

The distance between the clutch ends 10, the distance between the clutch ends 14, and the distance the sliding clutch portion composed of sleeves 12 and 13 are all so adjusted and regulated relatively to each other that when such sliding clutch portion is at one extreme of its movement a clutch-gear 14 interlocks with clutch-gear 10 of loose gear 6, locking the same to the shaft and causing it to rotate the shaft, the wheel 11, and the winding-drum in one direction, while if such sliding clutch portion be thrown to the other extreme of its movement the clutch end of sleeve 13 will mesh with clutch-gear 10 of loose gear 7, locking the latter to the shaft and causing the rotation of the gear 11 and winding-drum in the opposite direction, while if the sliding clutch portion be left in or moved to an intermediate position all the gear-clutches 10 and 14 are entirely disengaged, and the shaft 8, gear-wheel 11, and winding-drum are unaffected by the revolution of the main driving-wheel and the wheels 6 and 7. That either of these conditions may ensue as desired, it is necessary to combine with the sliding sleeves 12 13 means by which they may be moved at will to any desired position, and convenient and easily-operated devices therefor are as follows: A clutch-lever 17 is pivoted in or to a bracket or support 18, secured to the base, and such lever, preferably, should be provided with a pawl-catch of the usual construction for locking and retaining it at the desired point. Its lower end is pivoted to one end of a longitudinal draw-rod 19, which may simply lie upon the base or be guarded and guided in suitable guideways. At its other end such draw rod or bar 19 is pivoted to the free end of the lower arm or member 20 of a lever composed of the parts 20, 21, and 22, of which 20 and 22 are at angle to each other, such angle being about or approaching to a right angle, and both being practically at about the same angle to the body of the part 21 connecting them, 20 and 22 being thus in substance a bell-crank lever whose arms are separated by the part 21, forming the fulcrum thereof, and pivoted in the standards 27. The arm 22 of this lever is pivoted to one end of a short arm 23, pivoted at its other end to a ring or collar 24, seated in a groove 37 on the periphery of sleeve 13, the sleeve being allowed to rotate therein, but the collar and sleeve moving sidewise together. From this it is evident that as the upper end of the clutch-lever 17 is thrown back from the winding-drum, as the connections are shown in the drawings, the sleeve 13 is thrown so that its clutch-gear engages with the clutch-gear of gear-wheel 7, and if the upper end of the clutch-lever 17 be thrown toward the winding-drum the sleeve 12 is thrown so that its clutch-gear is thrown into engagement with the clutch-gear of gear-wheel 6, while if such lever be left in a vertical position the clutch-gears of sleeve 12 and gear-wheel 6 and of sleeve 13 and gear-wheel 7 are entirely disconnected.

The winding-drum 16 preferably has a concaved face, and in its concavity are two or three turns of the rope 28, passing there around, the rope passing thence around the sheaves of pulleys 29 and 30, and thence, in case of an elevator, over a top drum or pulley. (Not herein shown.) In each limb of the rope or cable a cage may be secured, so that as one is ascending the other is descending, their movement being reversed at the ends of the ascent and descent by simply manipulating the lever 17, without stopping the motive power or reversing the direction thereof. When, however, the lever is set in the intermediate position, it is necessary that some braking or gripping mechanism be instantly thrown into operation to prevent the winding-drum either from turning or from turning too rapidly under the stress of any load which may be upon the cord or cable. To this end, at the forward extremity of the longitudinal draw-rod 19 a second draw-rod 33 is pivoted at one end and at its other to a lever 34, whose fulcrum is a pivot passing through it into the base.

Pivoted upon the base, or upon any suitable support therefrom, is a second lever 35, of the general shape of a bell-crank lever, connected at one end to the ribbon or leaf spring brake 31, extending around and encircling quite a portion of a peripheral edge of the winding or hoisting drum 16, the other end of such brake-spring being secured or attached to a lug, pin, or standard 32. The free end of the bell-crank lever 35 is formed with a projecting face or cam-surface 36, the lever being so arranged that this face shall normally lie in the path of the free end of lever 34, and be impinged on and pressed back thereby as the latter passes from one extreme of its movement to the other, but be clear thereof at such extremes, the impingement and forcing back being at the intermediate position only. Then, as the lever 17 is in an upright or intermediate position, the end of lever 34 pushes end 36 of lever 35 back, causing the latter to bring the spring-strip 31 against the edge of the winding-drum with such force as to act as a brake thereon.

By this construction and arrangement, arranging the main driving-wheel, the main transverse shaft, and the winding-drum in parallel planes, the operative parts are all grouped beneath the main driving-wheel, where they are somewhat protected and great compactness is attained, such compactness as insures adaptability of the whole apparatus being mounted on a comparatively small base and on a comparatively small truck, if desired, so that it may easily and conveniently be transported from place to place.

Having thus described my invention, what I claim is—

1. In a winding mechanism, the combination of a shaft, gear-wheels loose thereon, a gear-wheel rigid thereon, a main driving-wheel meshing with the loose gear-wheels, a clutch mechanism on such shaft for locking and unlocking the loose gears to and from the shaft, means for operating such clutch mechanism, a winding-drum, and a gear-wheel thereon meshing with the gear-wheel rigid on the shaft, substantially as described.

2. In a winding mechanism the combination of a shaft, gear-wheels loose thereon, a gear-wheel rigid thereon, a main driving-wheel meshing with the loose gear-wheels, a clutch mechanism sliding on such shaft and at will locking one loose gear to and unlocking the other from the shaft or disconnecting both therefrom, a brake, means for operating the clutch mechanism and applying the brake in the intermediate position thereof, a winding-drum, and a gear-wheel thereon meshing with the loose gear-wheels, substantially as set forth.

3. The combination of a shaft, gear-wheels loose thereon, a gear-wheel rigid thereon, a main driving-wheel meshing with the loose gear-wheels, a clutch mechanism sliding on the shaft, a winding-drum, and a gear thereon meshing with the gear rigid on the shaft, the shaft and winding-drum and its gear being located in planes parallel to the plane of and immediately beneath the main driving-wheel, substantially as set forth.

4. The combination of main driving-wheel 4, shaft 8, loose gears thereon, rigid gear 11, winding-drum 16, with gear 15, the clutch mechanism sliding on the shaft, the collar on the clutch mechanism, the angled lever 20 21 21, rod 19, and lever 17, substantially as set forth.

5. The combination of the main driving-wheel, the transverse shaft, loose gears thereon, a gear rigid thereon, a winding-drum having a gear meshing with the gear rigid on the shaft, a clutch mechanism sliding on the shaft, means, as described, for moving such clutch mechanism, a brake adapted to take on the winding-drum, and a lever 35, connected to and adapted to operate such brake, and a lever connected to the clutch mechanism for operating or moving such first lever, substantially as set forth.

In testimony whereof I affix my signature in presence of two witnesses.

SAMUEL S. RUMBERG.

Witnesses:
ISHAM R. HOWZE,
A. J. O'BRIEN.